United States Patent
Gonzalez Poche et al.

(10) Patent No.: US 9,051,507 B2
(45) Date of Patent: Jun. 9, 2015

(54) COMPLETION FLUID

(75) Inventors: Jose Miguel Gonzalez Poche, Colinas de Carrizal (VE); Franklin Quintero Godoy, Los Teques (VE); Rosa Linda Marquez Silva, San Antonio de los Altos (VE); Sergio Rosales, Los Teques (VE); Maria Luisa Ventresca Di Filippo, Los Teques (VE)

(73) Assignee: Intevep, S.A., Caracas (VE)

( * ) Notice: Subject to any disclaimer, the term of this patent is extended or adjusted under 35 U.S.C. 154(b) by 437 days.

(21) Appl. No.: 13/428,393

(22) Filed: Mar. 23, 2012

(65) Prior Publication Data

US 2013/0252857 A1     Sep. 26, 2013

(51) Int. Cl.
- C09K 8/60     (2006.01)
- C09K 8/16     (2006.01)
- C09K 8/64     (2006.01)
- C09K 8/524    (2006.01)

(52) U.S. Cl.
CPC ............... *C09K 8/524* (2013.01); *C09K 8/602* (2013.01)

(58) Field of Classification Search
CPC ............ C09K 8/04; C09K 8/05; C09K 8/584; C09K 8/602; C09K 2208/06; Y10S 507/925; Y10S 507/936

USPC ................................. 507/244, 261, 141, 238
See application file for complete search history.

(56) References Cited

U.S. PATENT DOCUMENTS

| | | | |
|---|---|---|---|
| 3,599,716 A | | 8/1971 | Thompson |
| 3,620,303 A | | 11/1971 | Halbert, Jr. et al. |
| 3,629,127 A | | 12/1971 | Palmer et al. |
| 4,094,798 A | | 6/1978 | Tate et al. |
| 4,278,129 A | | 7/1981 | Walton |
| 4,541,483 A | | 9/1985 | Walton |
| 4,738,789 A | | 4/1988 | Jones |
| 4,882,075 A | | 11/1989 | Jones |
| 5,008,026 A | | 4/1991 | Gardner et al. |
| 5,256,209 A | * | 10/1993 | Chihara et al. .................. 134/38 |
| 2001/0034311 A1 | * | 10/2001 | Saxena et al. ................. 510/152 |
| 2005/0199428 A1 | * | 9/2005 | Dixon ............................. 175/65 |
| 2008/0110618 A1 | | 5/2008 | Quintero et al. |
| 2008/0274918 A1 | | 11/2008 | Quintero et al. |

* cited by examiner

*Primary Examiner* — Aiqun Li
(74) *Attorney, Agent, or Firm* — Bachman & LaPointe, PC

(57) ABSTRACT

An aqueous well completion/workover fluid, including a surfactant, at least one salt and an alkaline material, wherein the surfactant comprises a mixture of a phosphate ester and a non ionic ethoxylated alcohol, wherein the fluid has a pH between 6 and 8, and wherein the fluid generates an interfacial tension with crude oil of less than or equal to 1 dyne/cm. The fluid is not harmful to a formation if it penetrates the formation, and further exhibits an excellent detergency which can be beneficial as well.

11 Claims, 3 Drawing Sheets

COMPLETION FLUID

BACKGROUND OF THE INVENTION

The invention relates to the field of hydrocarbon well completion fluids, and more particularly to a surfactant package which reduces or eliminates formation damage during the use of the completion fluid.

Hydrocarbon wells for liquid and gas hydrocarbons from subterranean reservoirs involve a well drilled from the surface into communication with the reservoir. At the point of communication between the well and the reservoir, the condition of the reservoir around the well is a very sensitive and important region.

Early in the life of a well, drilling fluids and other fluids are used to lubricate the drill bit, carry cuttings from the formation to the surface and balance pressure within the reservoir. These drilling fluids are completely different in composition from fluids used later in the preparation of the well which are known as workover or completion fluids, and which will be collectively referred to herein as completion fluids.

Completion fluids are typically much lighter than drilling fluids used earlier in the life of the well. Further, completion fluids are typically used, among other things, for removing traces of drilling fluids and the like from the well to the greatest extent possible to prepare the well for use in producing hydrocarbons. A concern exists with respect to completion fluids, which can invade the surrounding reservoir from the well, for example due to over pressure of the fluid in the well column as compared to the formation. These fluids invading the reservoir can change the characteristics of the reservoir and have an adverse impact on the ability of hydrocarbons in fluid and gaseous form to flow through the reservoir and to the well for production to the surface.

It is a focus of this invention to provide a completion fluid which addresses this issue.

SUMMARY OF THE INVENTION

In accordance with the present invention, a completion fluid is provided which includes a surfactant comprising phosphate ester and non-ionic ethoxylated alcohol, at least one salt, and an alkaline source.

According to the invention, when these components are used in very low concentrations, while keeping the pH of the fluids substantially neutral, a fluid is produced which does not adversely impact the fluid flow characteristics of the reservoir, despite the fact that the fluid may penetrate into the reservoir during use of the completion fluid. Further, this fluid does not form emulsions in the formation which can result in fluids adhered to the formation, where they can also interfere with flow characteristics of the reservoir.

According to the invention, an aqueous well completion/workover fluid is provided, which comprises a surfactant; at least one salt; and an alkaline material, wherein the surfactant comprises a phosphate ester and non-ionic ethoxylated alcohol mixture, wherein the salt can be selected from the group consisting of potassium chloride (KCl), potassium acetate ($CH_3CO_2K$), sodium chloride (NaCl, calcium chloride ($CaCl_2$) and mixtures thereof, wherein the alkaline material is preferably an amino-alcohol, wherein the fluid has a pH between 6 and 8, and the fluid generates an interfacial tension with crude oil of less than or equal to 1 dyne/cm, and the fluid shows excellent detergency properties. This fluid provides significant benefits concerning the decrease of chemical formation damage, such as, prevention of generation of high viscosity water-in-crude oil emulsions, providing higher crude oil mobility due to reduction of the capillary forces, and producing better wettability conditions allowing better production rates.

In further accordance with the invention, a completion process is provided comprising the steps of pumping a completion fluid into a well, the completion fluid comprising a surfactant; at least one salt; and an alkaline material, wherein the surfactant comprises a phosphate ester and non ionic ethoxylated alcohol mixture, and wherein the salt is selected from the group consisting of potassium chloride (KCl), potassium acetate ($CH_3CO_2K$), sodium chloride (NaCl, calcium chloride ($CaCl_2$) and mixtures thereof, wherein the alkaline material is preferably an amino-alcohol, wherein the fluid has a pH between 6 and 8, the fluid generates an interfacial tension with crude oil of less than or equal to 1 dyne/cm, and the fluid shows excellent detergency properties, and holding the completion fluid in the well during a completion process.

BRIEF DESCRIPTION OF THE DRAWINGS

A detailed description of preferred embodiments of the invention follows, with reference to the attached drawings, wherein.

DETAILED DESCRIPTION

The invention relates to a completion/workover fluid, which will be referred to herein as a completion fluid, and more particularly, to a completion fluid including as a critical ingredient a surfactant comprising a mixture of an ester phosphate with non ionic ethoxylated alcohol. In very low concentrations, this surfactant can help to give the completion fluid good properties to prevent forming of high viscosity water-in-crude oil emulsions within the reservoir. The fluid thereby provides higher crude oil mobility through the formation, for example due to reduction of capillary forces and better wetability conditions. This is accomplished by both preventing formation damage due to the completion fluid, and also by the completion fluid reducing problems caused by previous fluids used in the well.

In accordance with the invention, it has been found that a completion fluid which has an ultra-low interfacial tension between the fluid and crude oil present in the formation can substantially reduce formation damage produced by the fluid, and can remove formation damaging emulsions left in the formation, for example from the drilling fluid used to drill the well.

In accordance with the present invention, a completion fluid is provided which advantageously contains an ester phosphate surfactant, preferably a mixture of an ester phosphate and non-ionic ethoxylated alcohol surfactant. The surfactant mixture of the present invention is preferably the product of a chemical reaction between ethoxylated alcohol and polyphosphoric acid, without further purification or separation process. The ethoxylated alcohol is used in excess with respect to the polyphosphoric acid to ensure that all the acid is consumed during the reaction, and this is why the final mixture contains a high amount of residual ethoxylated alcohol in the final product. The chemical process employs from two to four times excess of ethoxylated alcohol (in mass), minimizing the level of unconverted polyphosphoric acid. The resulting surfactant package is a mixture of ester phosphate (A, FIG. 1) and non-ionic ethoxylated alcohol (B, FIG. 1).

Figure 1:
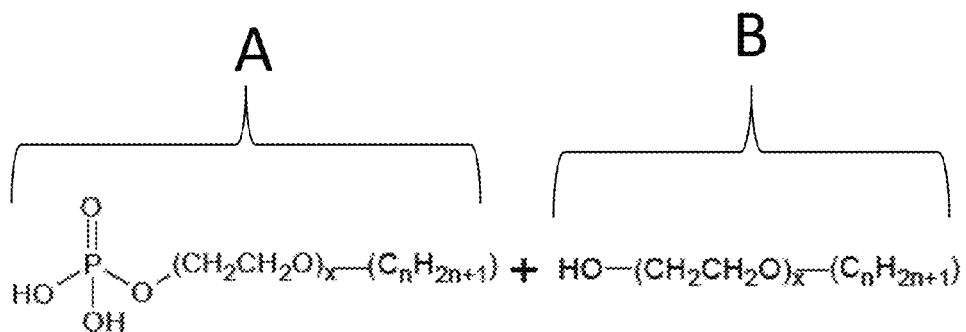
FIG. 1 shows the chemical structure of a surfactant package comprising ester phosphate and non-ionic ethoxylated alcohol according to the invention.

In FIG. 1, the surfactant includes ester phosphate and ethoxylated alcohol each having a grade of ethoxylation, x, which is approximately 3, 6, or 9, and a length of the alkyl hydrocarbons, n, which is between 12 and 14. Thus, in FIG. 1, x preferably equals 3, 6, or 9, and n is preferably between 12 and 14.

The completion fluid which includes the above surfactant is preferably an aqueous completion fluid having as a substantial component a water phase. In addition to the surfactant package, the completion fluid can advantageously contain at least one salt such as potassium chloride, potassium acetate, sodium chloride, calcium chloride, and mixtures thereof or the like, and may also'include an alkaline material such as amino-alcohol.

According to the invention, the surfactant package preferably contains between about 20 and about 60% ester phosphate and between about 80 and about 40% ethoxylated alcohol, both taken with respect to weight of the surfactant package. This surfactant package is helpful in preventing and/or removing formation damage which can result from unfavorable wetability conditions caused by drilling fluid and other fluids used prior to the completion fluid, and which can also be caused by components of conventional completion fluids themselves. This surfactant package is preferably present in the completion fluid in an amount between about 0.2 and about 3.0% w/w, more preferably between about 0.5 and about 1% w/w with respect to the weight of the overall completion fluid.

One or more salts are preferably included to prevent clay swelling or deflocculation, both of which can adversely impact flow conditions in the well, due to the blocking of the pore spaces in the subterranean formation. The salt(s) can be selected from the group consisting of potassium chloride (KCl), potassium acetate ($CH_3CO_2K$), sodium chloride (NaCl), calcium chloride ($CaCl_2$) and a mixture thereof, preferably potassium chloride (KCl), and can be used in an amount between about 1 and about 5% w/w with respect to weight of the overall completion fluid.

The alkaline material, which can preferably be an amino-alcohol such as but not limited to mono-ethanolamine (MEA), is advantageously used as a pH modifier to maintain the pH of the completion fluid at substantially a neutral value, preferably between 6 and 8. Depending upon the other components of the fluid, a suitable amount of alkaline material is preferably added to adjust the pH to the desired value. The mono-ethanolamine (MEA) is preferably added to the solution in an amount between about 0.15 and about 0.5% w/w with respect to weight of the overall completion fluid, which is generally sufficient to provide the desired pH. Examples of other alkaline materials include potassium hydroxide (KOH), sodium hydroxide (NaOH), calcium hydroxide ($CaOH_2$) and mixtures thereof.

The above components when mixed in an aqueous completion fluid advantageously provide a fluid that generates an interfacial tension with the crude oil present in the formation of less than or equal to 1 dyne/cm, and preferably less than or equal to $10^{-2}$ dyne/cm. This low interfacial tension helps to provide higher crude oil mobility due to reduction of the capillary forces. Additionally the surfactant package provides better wettability conditions allowing better production rates. Due to the presence of the surfactant package in the formulation, the fluid is far less likely to cause any adverse effects upon the formation; therefore penetration of this completion fluid into the formation is not undesirable.

As will be further demonstrated below, it has been discovered that the completion fluid of the present invention produces an unexpected result in that the amino-alcohol improves the overall performance of the surfactant in the aqueous solution when used in a sufficient amount to obtain a neutral pH. In addition, the undesirable formation of a gel phase was noticed at 3% w/w of surfactant concentration and an amino-alcohol concentration (as MEA) of approximately 0.7% w/w. This indicates a strong ester/MEA molecular interaction, and these interactions are totally controlled with the amount of MEA present according to the present invention. In order to avoid formation of gel phase, it is desirable to avoid surfactant concentrations greater than or equal to 3% with a pH of less than 7. In the present invention the concentration of alkaline material employed was 0.7%. It was experimentally determined that the amount of mono-ethanolamine required to achieve a pH between 6-8 units with a surfactant concentration greater than or equal to 3% w/w are between 1-1.5% w/w. Thus, it is preferred to maintain surfactant concentration less than 3%, w/w at a pH of the solution less than 7, and this therefore calls for concentration of alkaline material to be less than 1% w/w.

As indicated above, the present invention is directed to a completion fluid containing a surfactant package as described. Typically, a completion fluid is preferably used in the form of a clean, solid-free brine which is used during the perforation of the well. This type of fluid helps to maintain well productivity. The completion procedure typically involves cementing a casing in the well, displacing remaining drilling fluid with the completion fluid, and then perforating the well. When horizontal and multilateral wells are used, and when control of unconsolidated formations is an issue, this completion technology becomes more complex. As a result, specialized completion fluid packages are increasingly in demand. Further, these completion fluids are used in a specific step of the preparation of the well, and are not to be confused with secondary or tertiary production fluids, fluids to be used in enhanced oil recovery methods and other fluids used in totally different processes on the well.

The completion fluid of the present invention is preferably a clean, relatively solid-free solution which may include one or more dissolved salts to adjust the weight of the solution to provide the desired amount of pressure, and further the solution should be free of components which would react with the subterranean formation or hydrocarbons contained therein.

The completion fluid should also be compatible with clay encountered in the well and/or producing formation to prevent clay swelling or deflocculating which could also cause the pore spaces in the formation to become blocked. For this reason, one or more salts are included and this component advantageously serves to control any such clay swelling or deflocculating.

The salts which can be used for adjusting the weight of the solution can be any well known salts suitable for such purposes, including but not limited to calcium chloride and/or calcium bromide, and these can be the same or different from the at least one salt used in the fluid to prevent swelling of clay.

The rheology of the completion fluid can also be controlled through the addition of polymers, non-limiting examples of which include xanthan gum, hydroxy-ethyl-cellulose and the like, in amounts from about 0.1% to 5% w/w.

The completion fluid of the present invention can be used in various well environments, but ideally can be used in low-pressure reservoirs where fluid invasion is unavoidable. A low pressure reservoir is defined as one where the ratio of formation pressure to well depth is less than 42 psi/ft. The typical range of a low pressure reservoir depends on its depth; generally, it is considered a reservoir of low pressure when pressure is in a range between 750-950 psi.

In prior completion fluids, the overall approach has been to prevent invasion of the reservoir from the completion fluid. Totally contrary to this conventional belief, the present invention actually encourages a controlled invasion of the completion fluid into the formation and, through the advantageous surfactant package included in the completion fluid, formation damage from earlier processes such as drilling and other completion steps can be eliminated. By obtaining ultralow facial tension between the aqueous solution and crude oil present in the well, formation damage due to unfavorable conditions such as water-in-oil emulsions, capillary blockage, unfavorable wetability conditions and the like can be reduced or eliminated.

A further distinguishing factor between the present completion fluid and fluids used in other processes such as drilling and the like is that such fluids typically contain a much larger amount of surfactant. That is because such fluids typically have, as a goal, to form emulsions with other fluids. In the present invention, the surfactant package of a completion fluid is maintained at a very low concentration relative to other fluids, and this very low concentration is perfectly well suited to the goal of adjusting the interfacial tension between the completion fluid and hydrocarbon encountered in the well.

As mentioned above, the preferred surfactant package includes a blend of ester phosphate and non-ionic ethoxylated alcohol, preferably wherein the length of alkyl hydrocarbon chains is C12-C14 and wherein the grade of ethoxilation is 3, 6, or 9.

Other specific types of surfactant mixtures within this broad genus include: nonionic surfactants chosen from ethoxylated alkyl phenols, ethoxylated alcohols or co-polymers of ethylene oxide, and anionic surfactants such as an alkyl aryl sulfonate, alkyl sulfonate, alkyl sulfates, and sulfusuccianates, or sodium salts of these.

Fluids with different surfactant package concentrations were prepared in order to test their detergency properties and describe the aqueous appearance of the formulation. It has be found that detergency capability may be used as a main surfactant selection criteria for designing oil well working fluids based on aqueous surfactant solutions. The results obtained in return permeability tests indicated a relationship between detergency and crude oil mobility in Berea cores, i.e. higher detergency results in better crude oil mobility.

The detergency of a fluid is related to the ability of the fluid, in this case an aqueous surfactant solution, to remove a liquid attached to a solid. This action can be achieved by three known mechanisms, namely roll up, snap off and solubilization, which are dependent on the interfacial properties of the solid-liquid-liquid system. This phenomenon is extremely important in several processes associated to the oil industry, especially in enhanced oil recovery methods by surfactant injection, oil or gas well stimulation with micellar solutions, and completion fluids based on aqueous surfactant solutions, among others.

The use of conventional completion fluids in depleted and/or low-pressure reservoirs leads to an unavoidable fluid invasion to the formation due to the overbalance conditions existing during the operation. The presence of said fluid in the reservoir area, closest to the well bore, can alter the physical and chemical interactions that exist in the crude oil/rock/formation water system, and may cause a decrease in productivity of the well, associated with a change of crude oil effective permeability generated in the affected area.

Surfactants can be used as additives in completion fluids to provide significant benefits concerning the decrease in formation damage, such as prevention of generation of high viscosity water-in-crude oil emulsions (increasing the viscosity of oil, reducing its mobility in the porous media), higher crude oil mobility due to reduction of the capillary forces and better wettability conditions. It has also been found that detergency capability may be used as a main surfactant selection criteria for designing oil well working fluids based on aqueous surfactant solutions. The results obtained in return permeability tests indicated a relationship between detergency and crude oil mobility in Berea cores, i.e. higher detergency better oil mobility.

In order to evaluate the detergency of an aqueous surfactant solution, the quantity of crude oil removed from a quartz surface was measured by analyzing several consecutive images of the spontaneous detachment of crude oil from a surface. The crude oil was GF-175 from the oilfield Guafita, District Apure, in Venezuela. This is a medium crude oil having the following characteristics:

| | Density ($g/cm^3$) 25° C. | Saturated (%) | Aromatics (%) | Resins (%) | Asphaltens (%) | N° Ácid (mg KOH/g) |
|---|---|---|---|---|---|---|
| GF-175 | 0.878 | 28 | 36 | 34 | 2 | 0.21 |

The following procedure was used: a flat quartz surface (1×4 cm) was immersed in crude oil for 4 hours at 25° C. in order to cover the surface with a thin crude oil film. Then, the flat quartz surface covered with crude oil was immersed in an aqueous surfactant solution (4 ml). Immediately, a digital camera recorded the spontaneous detachment of crude oil from the surface (if any) for 20 min. (I picture every 10 seconds). After that, the image sequences were analyzed using image analysis software. The detergency percent was established by the ratio between crude oil area covered at the time of the measurement and crude oil area covered at initial time. Thus, detergency percent (at 1,200 s) higher than 90% means an excellent detergency, i.e. the crude oil is almost completely removed from the surface by surfactant action. Detergency percents between 60-90% mean a good detergency, while detergency percents lower than 60% were considered as poor detergency properties. It should be noted that the test used in this procedure was adapted to the environment of crude oil over a solid sample from the basic procedure of ASTM D 3050.

Figure 2:
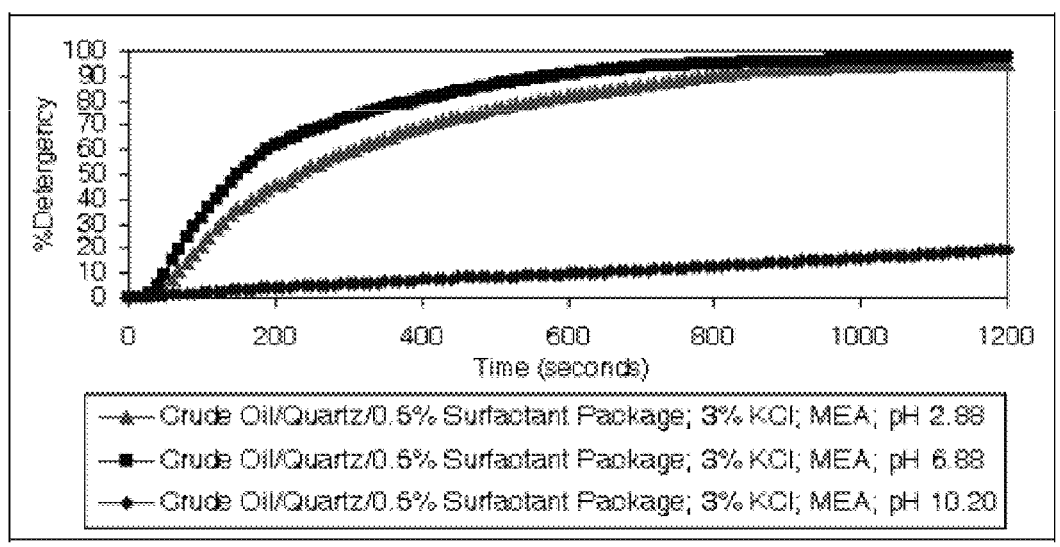
FIG. 2 shows the results of detergency testing in according with the present invention.
Figure 3:
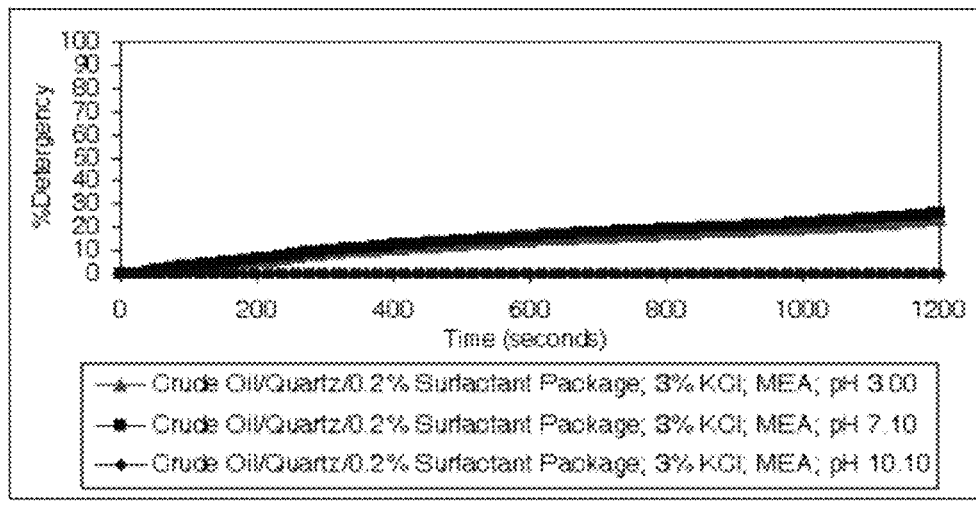
FIGS. 3-6 further illustrates the results of the detergency testing in according to the present invention.
Figure 4:
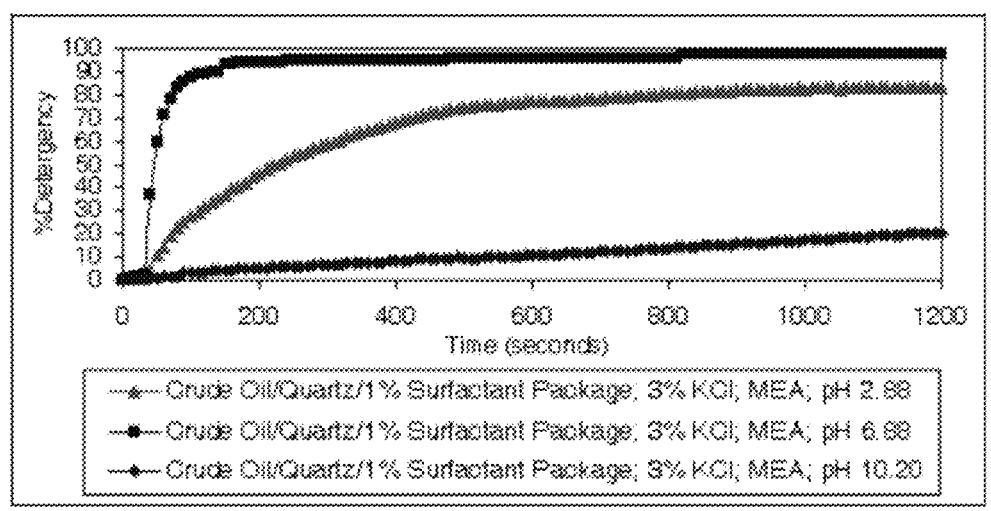
Figure 5:
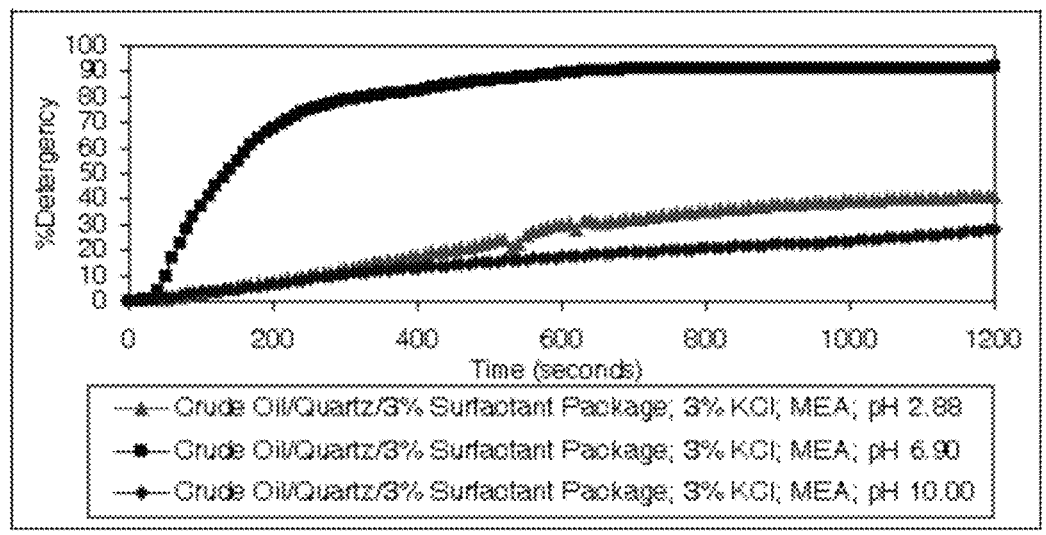
Figure 6:
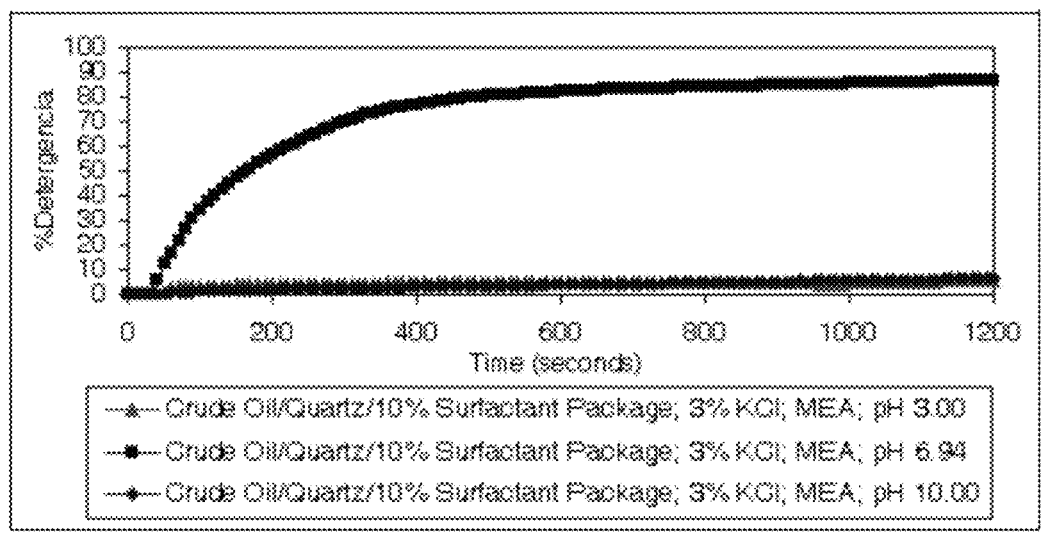

Detergency tests were run to evaluate different fluids of the present invention; A series of pictures were obtained for a system crude oil/quartz/0.5% surfactant package; 3% KCl; MEA, modifying the MEA to evaluate different values of pH. For this formulation, it is noted that highest detergency was obtained at a pH of 6.88 wherein practically all crude oil was removed spontaneously from the surface. Similar results were obtained with this formulation at pH 2.88. The results are presented in terms of detergency percent, as shown in FIG. 2. Formulations at pH of 2.88 and 6.88 show excellent detergency properties, and a detergency percent greater than 90% at 1,200 s were observed. Formulation at pH 10.20 shows poor detergency properties, i.e. the crude oil is not removed from surface.

The next evaluation focused on the effect of surfactant package concentration on detergency properties at different pH. Concentrations of 0.2, 0.5, 1, 3 and 10% w/w were evaluated keeping constant the amount of KCl (salt), and the amount of MEA (alkaline source) for each evaluated pH. FIGS. 3-6 present the detergency percent results in graph form. Table 1 summarizes the results as well, and the detergency was based upon higher than 90% meaning an excellent detergency, detergency percents between 60-90% meaning a good detergency, and detergency percents lower than 60% were considered as poor detergency properties.

TABLE 1

Effect of surfactant package concentration and pH over detergency at 25° C.

| FORMULATION | APPEARANCE | pH | DETERGENCY |
|---|---|---|---|
| 0.2% w/w Surfactant Package; 3% KCl; MEA | Micelar solution | 3.00 | Poor |
| 0.2% Surfactant Package; 3% KCl; MEA | Micelar solution | 7.10 | Poor |
| 0.2% Surfactant Package; 3% KCl; MEA | Micelar solution | 10.10 | Poor |
| 0.5% surfactant package; 3% KCl; MEA | Micelar solution | 2.88 | Excellent |
| 0.5% surfactant package; 3% KCl; MEA | Micelar solution | 6.88 | Excellent |
| 0.5% surfactant package; 3% KCl; MEA | Micelar solution | 10.20 | Poor |
| 1% surfactant package; 3% KCl; MEA | Micelar solution | 2.88 | Good |
| 1% surfactant package; 3% KCl; MEA | Micelar solution | 6.88 | Excellent |
| 1% surfactant package; 3% KCl; MEA | Micelar solution | 10.20 | Poor |
| 3% surfactant package/3% KCl/MEA | Gel | 2.88 | Poor |
| 3% surfactant package/3% KCl/MEA | Micelar solution | 6.90 | Excellent |
| 3% surfactant package/3% KCl/MEA | Micelar solution | 10.00 | Poor |
| 10% surfactant package/3% KCl/MEA | Gel | 3 | Poor |
| 10% surfactant package/3% KCl/MEA | Micelar solution | 6.24 | Good |
| 10% surfactant package/3% KCl/MEA | Micelar solution | 10 | Poor |

The parameter "appearance" in Table 1 is a qualitative description of the aqueous formulation. The chemical and physical compatibility was evaluated for all the components which comprise the completion fluid. A micellar solution means a solution wherein all components are dissolved completely in the aqueous media and there is not any chemical incompatibility. The term "gel" is self explanatory, and the viscosity in this case increases considerably, which is undesirable in this kind of operation because of pumping issues.

As indicated above, detergency is related to the ability of an aqueous surfactant solution to remove a liquid (crude oil) attached to a solid. This action can be achieved by three known mechanisms: roll up (roll back), snap off and solubilization, which are dependent on the interfacial properties of the solid-liquid-liquid system. The roll up mechanism is originated by adsorption of surfactant molecules on the water/crude oil interface which reduces the interfacial tension in the system and also the surfactant molecules adsorb onto the solid surfaces generating a wettability change (observed by a contact angle variation). So, this mechanism is related to the work of adhesion of the oil to the surface.

Therefore, if a surfactant formulation generates low interfacial tension in the water/oil system (<1 mN/m) and generates a water wet condition on surface (contact angle >90°), then, it is considered a system where crude oil can be removed from the surface with minimal mechanical agitation. The snap-off mechanism occurs when the contact angle is not high enough for the entire droplet to detach from the solid surface but a portion breaks off, leaving an oil film deposited on the surface. The snap-off mechanism is related to interfacial tension by the work of cohesion. Similar to roll up, snap-off oil removal is facilitated by lower oil/water interfacial tension because less mechanical energy is necessary to overcome the work of cohesion of the crude oil molecules.

The solubilization mechanism for oil removal is based on the partition of the crude oil molecules inside the hydrophobic core of micelles. This mechanism is only relevant at high surfactant concentration when large numbers of micelles are present.

The detergency is a desirable property in an aqueous surfactant solution used as completion fluid. It is believed that, when surfactant solution contacts or interacts with the crude oil trapped in the reservoir rock, the detergency mechanisms (roll up and snap-off) help to liberate the crude oil from the rock by reducing the work of adhesion and cohesion as explained above. Additionally, surfactant presence reduces the capillary forces in the media. Thus, the crude oil mobility in the reservoir rock increases which allows better production rates. Also the detergency helps to remove traces of drilling fluids in the wellbore, reducing chemical formation damage.

Considering the results of Table 1, desired performance is reached at a surfactant concentration between 0.2%-3%, even better between 0.5% and 1% with a sufficient amount of MEA to obtain a neutral (pH 7) aqueous solution.

As surfactant concentration was increased above 1%, the results deteriorated as shown in Table 1. Further, below a concentration of 0.5% w/w the surfactant failed to produce any desired results In order to evaluate the effect had by use of the completion fluid of the present invention on oil mobility, return permeability tests were carried out on Berea cores.

Return permeability tests can be used to evaluate the behavior of crude oil/fluid inside a porous medium, under temperature and pressure conditions of interest. Additionally, the test simulates the dynamic conditions of fluid injection and crude oil production that are commonly found in drilling and completion of wells. The porous medium is simulated by natural nuclei Berea sandstone.

Initially, formation water is displaced in both directions of flow, injection and production, to fully saturate the core and stabilize the clays in the core. To calculate the initial crude oil mobility, crude oil was displaced in the direction of production with a flow rate of 1 cc/min to full saturation of core. The average of five measures of pressure drop (DP) was taken. To evaluate the interaction of the completion fluid with the core and its effect on crude oil mobility, the aqueous completion fluid was displaced in injection direction. The completion fluid was injected with a flow rate of 1 cc/min; two porous volumes were injected. After that, the system was closed for twelve hours. After 12 hours of contact between the completion fluid and the crude oil in the core, the crude oil in was displaced production direction to fully saturate the core. The average of five measures of pressure drop (DP) was taken. In these return permeability tests the crude mobility can be calculated using Darcy's law. The rocks used in the return permeability tests were Berea cores with 19-21% porosity and a range of permabilities, between 300 to 450 mD. The Berea core dimensions were 6.15 cm of length and 3.78 cm of diameter. The Berea core is a sedimentary rock whose grains are predominantly sand-sized and are composed of quartz sand held together by silica Table 2 shows mineralogical composition of Berea core.

TABLE 2

Mineralogical composition of the Berea cores

| Silica | $SiO_2$ | 93.13% |
|---|---|---|
| Alumina | $Al2O_3$ | 3.86% |
| Ferric Oxide | $Fe_2O_3$ | 0.11% |
| Ferrous Oxide | FeO | 0.54% |
| Magnesium Oxide | MgO | 0.25% |
| Calcium Oxide | CaO | 0.10% |

Table 3 below sets forth the effect on crude oil (composition in Table 4) mobility in these cores when using various different formulations tested above with respect to Table 1. In Table 3, it should be understood that a negative value for crude oil mobility indicates that crude oil mobility has increased, and a positive value indicates a decrease in crude oil mobility.

TABLE 3

Effect of surfactant concentration and pH in return permeability test on Berea cores, conditions of pressure and temperature of 2.000 psi and 160° F. (71.1° C.)

| FORMULATION | pH | Crude Oil Mobility Variation $(M_i-M_f)$ (%)* |
|---|---|---|
| 0.2% surfactant package; 3% KCl; MEA | 7.00 | 8.12 |
| 0.5% surfactant package; 3% KCl; MEA | 6.8 | −18.33 |
| 1% surfactant package; 3% KCl; MEA | 2.90 | −6.30 |
| 1% surfactant package; 3% KCl; MEA | 6.90 | −30.00 |
| 1% surfactant package; 3% KCl; MEA | 10.00 | 4.20 |
| 3% surfactant package/3% KCl/MEA | 6.90 | 10.33 |
| 10% surfactant package/3% KCl/MEA | 6.90 | 2.30 |

TABLE 4

Chemical compositions of the crude oil used on the test, detergency and return permeability test

| | Density (g/cm³) 25° C. | Saturated (%) | Aromatics (%) | Resins (%) | Asphaltens (%) | N° Ácid (mg KOH/g) |
|---|---|---|---|---|---|---|
| Crude oil | 0.878 | 28 | 36 | 34 | 2 | 0.21 |

As indicated in Table 3, excellent results were obtained with respect to crude oil mobility when using concentration of surfactant of 0.5% and 1% w/w with respect to the fluids. With increases in surfactant, crude oil mobility decreased.

It is believed that the decrease in mobility is due to adverse impact upon wetability conditions in the formation, and due to the formation of undesirable emulsions within the formation which block pore space and inhibit fluid mobility of the oil.

It should be noted that the above is provided as an example of preferred embodiments of the present invention. Numerous other embodiments can be utilized within the broad scope of the present invention, and the present disclosure should not be viewed as being limiting upon the scope of the present invention. Rather, the scope of the invention is defined by the broad scope of claims as appended hereto.

What is claimed:

1. An aqueous well completion/workover fluid, comprising:
   a surfactant;
   at least one salt; and
   an alkaline material,
   wherein the surfactant comprises a mixture of a phosphate ester and a non ionic ethoxylated alcohol, wherein the fluid has a pH between 6 and 8, and wherein the fluid generates an interfacial tension with crude oil of less than or equal to 1 dyne/cm, wherein the at least one salt is selected from the group consisting of potassium chloride (KCl), potassium acetate ($CH_3CO2K$), sodium chloride (NaCl), calcium chloride ($CaCl_2$), and mixtures thereof, wherein the phosphate ester has the following chemical structure:

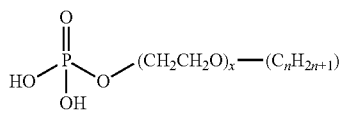

where:
x is the number of ethylene oxide units present in the molecule, and x=3, 6 or 9; and n is length of the alkyl hydrocarbon, and n=12–14, and wherein the non-ionic ethoxylated alcohol has the following chemical structure:

wherein:
x is the number of ethylene oxide units present in the molecule, and x=3, 6 or 9; and n is length of the alkyl hydrocarbon, and n=12–14.

2. The fluid of claim 1 wherein the alkaline material is an amino-alcohol.

3. The fluid of claim 1 wherein the fluid exhibits a detergency of at least 90%.

4. The fluid of claim 1, wherein the fluid contains the surfactant in an amount between 0.2 and 3.0% w/w with respect to weight of the fluid.

5. The fluid of claim 1, wherein the fluid contains the surfactant in an amount between 0.5 and 1% w/w with respect to weight of the fluid.

6. The fluid of claim 1, wherein the surfactant contains the phosphate ester in an amount between 20 and 60% w/w of the surfactant.

7. The fluid of claim 6, wherein the surfactant contains the non-ionic ethoxylated alcohol in an amount between 80 and 40% w/w of the surfactant.

8. The fluid of claim 1, wherein the at least one salt is potassium chloride.

9. The fluid of claim 1, wherein the at least one salt is present in an amount between about 1 and about 5% w/w with respect to weight of the fluid.

10. The fluid of claim 1, wherein the fluid contains the alkaline material in an amount between 0.15 and 1.00% w/w of the fluid.

11. The fluid of claim 1, wherein the alkaline material is selected from the group consisting of monoethanolamine, potassium hydroxide (KOH), sodium hydroxide (NaOH), calcium hydroxide ($CaOH_2$) and mixtures thereof.

* * * * *